Jan. 29, 1929.  1,700,394
L. F. YOUNG
AIR EXHAUST MECHANISM FOR HYDRAULIC CIRCUITS
Filed March 15, 1924
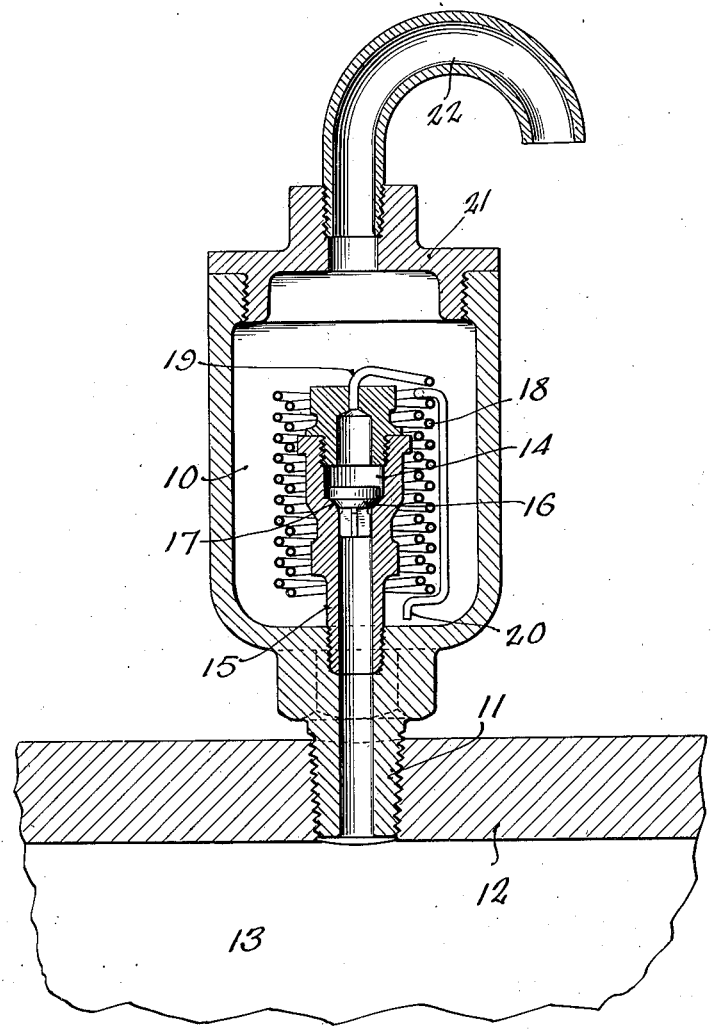
INVENTOR.
LAWRENCE F. YOUNG
BY
ATTORNEY.

Patented Jan. 29, 1929.

1,700,394

UNITED STATES PATENT OFFICE.

LAWRENCE F. YOUNG, OF MILWAUKEE, WISCONSIN, ASSIGNOR TO THE OILGEAR COMPANY, OF MILWAUKEE, WISCONSIN, A CORPORATION OF WISCONSIN.

AIR-EXHAUST MECHANISM FOR HYDRAULIC CIRCUITS.

Application filed March 15, 1924. Serial No. 699,588.

This invention relates to air release mechanism for hydraulic systems.

The accumulation of air or other gases in hydraulic systems is a menace to the proper and efficient functioning thereof. Provision has heretofore been made for preventing such accumulations by permitting the free escape of air from a high point in the system. Devices heretofore used for this purpose have been defective to the extent that they also permittted escape of the hydraulic medium in such quantities as to materially reduce the efficiency of the system and to render them unfit for use in high pressure systems.

One object of the present invention is the provision of improved means for maintaining a hydraulic system substantially free from air or other gases without permitting escape of the hydraulic medium in any appreciable quantities. This I accomplish by the use of a drain tube of small diameter and of such length as to effectively resist a flow of liquid in any appreciable quantities therethrough. I connect this tube at a high point in the system where the air ordinarily accumulates, the connection being preferably though not necessarily established through a pipe or the like of larger diameter which serves to collect the air as it accumulates and to direct the same to the tube. The tube offers a continuous exit for the air which is forced through it by the pressure in the system against the varying resistance offered by any liquid that may be in the tube. The tube though small, is preferably selected of such diameter as to avoid clogging by sediment or other particles of foreign matter contained in the liquid, the length being such as to effect the desired resistance against liquid flow. This length of tubing is preferably coiled so as to form a unit of conveniently compact form.

Another object is the provision of means for this purpose so designed as to prevent reentry of air therethrough when the pressure in the system is reduced.

Other objects and advantages will appear from the following description of an illustrative embodiment of the invention.

The single figure of the drawing is a sectional view of an air bleeder constructed in accordance with the present invention.

The device selected for illustration comprises a cup 10 having an integral hollow stem 11 for connection with a hydraulic pressure system, preferably at a high point therein. The stem 11 is shown tapped into the upper wall 12 of a pressure cylinder 13 constituting part of a hydraulic transmission system. Within the cup 10 is a small closed chamber 14 having a hollow stem 15 communicating with the stem 11. A check valve 16 cooperating with a valve seat 17 above the stem 15 controls communication between the cylinder 13 and chamber 14 so that fluid is free to flow from the cylinder to the chamber but reverse flow is prevented.

Communication between the chamber 14 and cup 10 is had through a choke coil 18 so designed as to permit a comparatively free flow of air or other gas therethrough but to offer considerable frictional resistance to the passage of a liquid therethrough. The coil shown constitutes a length of capillary tubing having one end 19 connected with the top of the chamber 14 and the other end 20 open to the cup 10, preferably adjacent the bottom thereof, where it may be readily sealed by a body of liquid within the cup.

In use this device is ordinarily connected at a high point in a hydraulic system where accumulation of air is likely to occur, the cup 10 being filled with oil or other liquid, preferably such as may be employed in the system. When so applied the air, as it accumulates, collects in the stem 11 and passes up through the liquid in stem 15 to the chamber 14 from which it rises into the tube 19. The tube is of small diameter and of such length as to effectively resist the escape of liquid in any appreciable quantities from chamber 14 therethrough. But the only resistance offered to the escape of air through the tube is that offered by liquid therein, and this resistance varies with variations in the amount of liquid therein. For example, with the tube 19 completely filled with a solid body of liquid there is a minute flow therethrough under the pressure in the system, and as air enters the tube, thus reducing the amount of liquid in the tube, the velocity of flow through the tube increases. Thus it will be noted that an increase of air in the tube increases the velocity of flow thus permitting air to escape in increasing amounts, but the very presence of air in the tube reduces the amount of oil therein so that the amount of oil actually escaping therethrough is not materially increased in spite of the increase in velocity of flow. A device of this character including a tube of one-sixteenth inch diameter and thirty-three feet long applied in the manner described to a hydraulic power transmission system operating at pressure of one thousand pounds per square inch, has maintained the system substantially free from entrained air with a maximum loss of liquid of about five cubic inches per minute. This liquid loss is negligible as compared with normal leakage losses at other points in the system. No serious difficulties have been experienced due to clogging with a tube of the diameter above mentioned.

The cup 10 is preferably covered by an appropriate cap 21, provision being made for carrying off the air and excess liquid therefrom through a discharge pipe 22 communicating with the cup through the cap.

It will be noted that by the arrangement above described, ample provision is made for preventing reentry of air into the system through the air escape mechanism. In the first place, the lower end 20 of the tube is effectively sealed against the admission of air so long as the level of liquid in the cup remains thereabove. Furthermore, the valve 16 is effective to prevent return flow of air or liquid from chamber 14 to the system.

Various changes may be made in the embodiment of the invention hereinabove described, without departing from or sacrificing any of the advantages of the invention as defined in the appended claims.

I claim:

1. The combination with a hydraulic high pressure system of a liquid container, and a length of tubing connecting said system and container beneath the level of liquid therein, said tubing being of such diameter as to effectively resist the flow of liquid in any considerable quantities therethrough.

2. The combination with a hydraulic high pressure system of a liquid container, a length of tubing connecting said system and container and of such diameter as to effectively resist the flow of liquid in any considerable quantities therethrough, and a check valve for preventing flow from said container to said system.

3. The combination with a hydraulic high pressure system of a liquid container, a chamber communicating with said system, a valve permitting fluid flow from said system to said chamber only, and a restricted passage between the top of said chamber and said container beneath the level of the liquid therein.

4. An air bleeder for hydraulic systems comprising a liquid container, a chamber therein for communication with the system, and a small diameter tube coiled about said chamber and communicating at one end with the top of said chamber and at the other end with the lower portion of said container.

5. An air bleeder for hydraulic systems comprising a liquid container, a chamber for communication with the system, a check valve preventing fluid flow from said chamber to the system, and a small diameter tube communicating at one end with the top of said chamber and at the other end with said container beneath the liquid level therein.

6. The combination with a high pressure hydraulic system of an air bleeder therefor comprising a member for connection with the system and having an air collecting chamber therein, and a small diameter tube communicating with the top of said chamber and of sufficient length to resist the passage of liquid in any appreciable quantities therethrough.

7. The combination with a high pressure hydraulic system of an air bleeder therefor comprising a small drain tube for connection with the system and of such length as to effectively resist a flow of liquid in any appreciable quantities therethrough, said tube being coiled into a unit of compact form.

8. The combination with a high pressure hydraulic system of a device for releasing air therefrom, said device comprising a length of small diameter tubing open to said system and of such length as to effectively resist the passage of liquid in any considerable quantity therethrough.

9. The combination with a high pressure hydraulic system of a device for releasing air therefrom, said device comprising a length of tubing open to said system and of such diameter as to effectively resist the escape of liquid in any considerable quantity therethrough, and means for preventing admission of air through said device to said system.

In witness whereof, I hereunto subscribe my name this 6th day of March, 1924.

LAWRENCE F. YOUNG.